United States Patent [11] 3,592,317

[72] Inventors Charles W. Chillson
Wayne;
John S. Perryman, Kinnelon, both of, N.J.
[21] Appl. No. 867,510
[22] Filed Oct. 20, 1969
[45] Patented July 13, 1971
[73] Assignee Curtiss-Wright Corporation

[54] SERVO ACTUATOR WITH MECHANICAL POWER AMPLIFIER AND MANUAL BYPASS
9 Claims, 12 Drawing Figs.

[52] U.S. Cl. ........................................................ 192/12 BA, 74/388 R, 192/17 D, 244/83 R, 192/48.9, 192/21
[51] Int. Cl. ........................................................ F16d 67/02, B64c 13/04
[50] Field of Search ............................................ 74/388 R; 192/12 BA, 17 D, 21, 48.9, 48.91; 244/83 R

[56] References Cited
UNITED STATES PATENTS

| | | | |
|---|---|---|---|
| 2,723,568 | 11/1955 | Summers, Jr. ................ | 244/83 (X) |
| 2,802,371 | 8/1957 | Lincoln et al. ................ | 74/388 (PS) |
| 2,817,246 | 12/1957 | Jencick ........................ | 74/388 (PS) |
| 2,939,329 | 6/1960 | Doerries ........................ | 192/21 (X) |
| 3,008,558 | 11/1961 | Bennett et al. ................ | 192/48.91 (X) |
| 3,068,977 | 12/1962 | Cottone ........................ | 192/48.91 (X) |
| 3,356,194 | 12/1967 | Stout ............................ | 192/48.9 (X) |

*Primary Examiner*—Allan D. Hermann
*Attorneys*—Arthur L. Frederick and Victor D. Behn

ABSTRACT: The servo actuator has a signal input device for providing signals of relatively small magnitudes and a mechanical power amplifier operably connected to the input device. The mechanical power amplifier is constructed and arranged to produce output forces of relatively great magnitude in response and proportional to the input signals for effecting the actuation of an output mechanism. A means coacting with the signal input device is also provided for bypassing or overriding the mechanical power amplifier for automatically effecting direct manual actuation of the output mechanism when the power amplifier fails to operate properly.

INVENTOR.
CHARLES W. CHILLSON
JOHN S. PERRYMAN
BY
Arthur Frederick
ATTORNEY

INVENTOR.
CHARLES W. CHILLSON
JOHN S. PERRYMAN
BY
Arthur Frederick
ATTORNEY

INVENTOR.
CHARLES W. CHILLSON
JOHN S. PERRYMAN
BY
ATTORNEY

INVENTOR.
CHARLES W. CHILLSON
JOHN S. PERRYMAN
BY
[signature]
ATTORNEY

INVENTOR.
CHARLES W. CHILLSON
JOHN S. PERRYMAN
BY

ATTORNEY

INVENTOR.
CHARLES W. CHILLSON
JOHN S. PERRYMAN
BY
Arthur Frederick
ATTORNEY

INVENTOR.
CHARLES W. CHILLSON
JOHN S. PERRYMAN
BY
[signature]
ATTORNEY

INVENTOR.
CHARLES W. CHILLSON
JOHN S. PERRYMAN
BY
Arthur Frederick
ATTORNEY

SERVO ACTUATOR WITH MECHANICAL POWER AMPLIFIER AND MANUAL BYPASS

BACKGROUND OF THE INVENTION

This invention relates to control systems and, more particularly, to servo actuators of control systems, which servo actuators have power amplifiers and means for overriding or bypassing the power amplifier.

It is conventional in servo actuating devices for control systems to provide power amplifiers or boosters which produce output forces of relatively great magnitude for effecting actuation of an output mechanism in response and proportional to input signals of relatively small magnitudes. Many of these power amplifiers are of the hydraulic or pneumatic type, which amplifiers comprise pumps, valves, accumulators and reservoirs interconnected by fluid conduits to thereby form rather large, complex and expensive assemblies. A further undesirable characteristic of pressurized fluid amplifier systems is that a fixed position of adjustment must be maintained by fluid pressure, the pressurization of the fluid constituting a constant power drain. The inefficiency of such a control system is particularly undesirable when employed in flight control systems of aircraft, such as control of swashplates of helicopters. Another disadvantage of pneumatic or hydraulic-type amplifiers is that of load feedback in manual override situations which, in the case of a flight control system, can result in pilot fatigue. A still further shortcoming of present fluid systems is the vulnerability of pneumatic and hydraulic amplifiers to damage and failure by reason of the numerous components and the extensive external interconnecting piping. Furthermore, a slight leakage, resulting in pressurized fluid loss, completely renders the power boost system inoperative. Obviously, this vulnerability to damage and failure is particularly objectionable in military aircraft which are subject to hostile fire.

Accordingly, it is one of the objects of this invention to provide in a servo actuator a mechanical power amplifier whereby the disadvantages attendant pressurized fluid power amplifiers are obviated.

It is another object of the present invention to provide, in a servo actuator having a power amplifier, for the actuation of an output mechanism upon inoperativeness or malfunction of the power amplifier.

It is a further object of this invention to provide a servo actuator of relatively simple and compact construction in which external fluid piping has been eliminated.

A still further object of this present invention is to provide a servo actuator having a power amplifier in which load feedback to the operator and power source during a "hold" or inactive phase of operation is obviated.

A feature of this invention is the completely mechanical construction of the power amplifier, the entire assembly of which is contained in a single housing to thereby form a unitary structure having no external high-pressure fluid conduits and capable of relatively quick and easy removal and replacement.

Another feature of the present invention is the coaction in the power amplifier between an indexing means and camming means for intermittently energizing the spring clutches of the power amplifier in response to an input signal to produce a cyclic output force.

A further feature of this invention is the provision of an input signal means cooperatively associated with the indexing and camming means for temporarily storing input signals until camming means is unloaded so that input signal forces of relatively small magnitude are required to effect energization of the spring clutches. This feature of the present invention contributes to the extremely high-gain signal force to output force characteristic of the servo actuator of this invention.

A still further feature of this invention is the provision of measuring and transmitting means cooperatively associated input signals introduced into the power amplifier and the output or feedback signals from the power amplifier, the measuring means automatically functioning to cause the power amplifier to operate to bring the power amplifier and control into proper positional relationship. This feature effectively allows transfer from manual to servo actuator control and back to manual control without loss of position index between the control signal input and the output mechanism.

SUMMARY OF THE INVENTION

Accordingly, the present invention contemplates a novel mechanical servo actuator which comprises a bypass unit, including an input signal means and an output power means, connected to a power amplifier to transmit to the latter an input signal and thereby cause actuation of the power output means in response to said input signal.

The bypass unit is provided with a normally engaged clutch for interconnecting the power output means with an output mechanism, which clutch automatically disconnects the power output means from the output mechanism, when the power amplifier malfunctions or is inoperative, and directly couples the input signal means with the output mechanism to provide thereby direct manual control of the output mechanism.

The power amplifier has a rotary force amplification means which is connected to a source of rotary power and to an output member, the output member being, in turn, connected to the power output means to rotate the latter. A bidirectional clutch means is interposed between the output member and the rotary force amplification means to selectively effect transmission of rotation of the output member in one direction or the opposite direction or interrupt transmission of rotary motion and, in turn, movement of the output mechanism. The clutch means includes a spring energizing means which functions in response to the signals emitted by the input signal means of the bypass unit to energize the clutch means and thereby effect rotation of the output member in the direction and in the amount comparable to that indicated by the input signal means.

The spring energizing means, in another feature of this invention, has an indexing means connected to the rotary force amplification means for rotation and mounted for rectilinear movement and camming means mounted for rectilinear movement relative to the indexing means to effect movement of the latter. The indexing means and camming means coact to provide for a cyclic engagement of the clutch means and intermittent rotary movement of the output member and the power output means. Also, the spring energizing means is constructed and arranged to temporarily store an input signal and thereby provide for rectilinear movement of camming means when it is relatively free of any resistive load.

The bypass unit may also include, in accordance with this invention, a measuring and transmitting means connected to the input signal means and to the power output means to sense the relative position of the input signal and output means and, if necessary, automatically cause the power amplifier to rotate the output member to the preselected positional relationship to the input signal means.

The entire servo actuator may be enclosed in a single unitary housing in which a small quantity of lubricant may be disposed to provide splash lubrication of the bearings, gears and other components of the apparatus.

The above features and other objectives and advantages of the present invention will appear more fully hereinafter from a consideration of the detailed description which follows when taken together with the accompanying drawings wherein one embodiment of the invention is illustrated, and in which.

DESCRIPTION OF A PREFERRED EMBODIMENT

Figure 1:
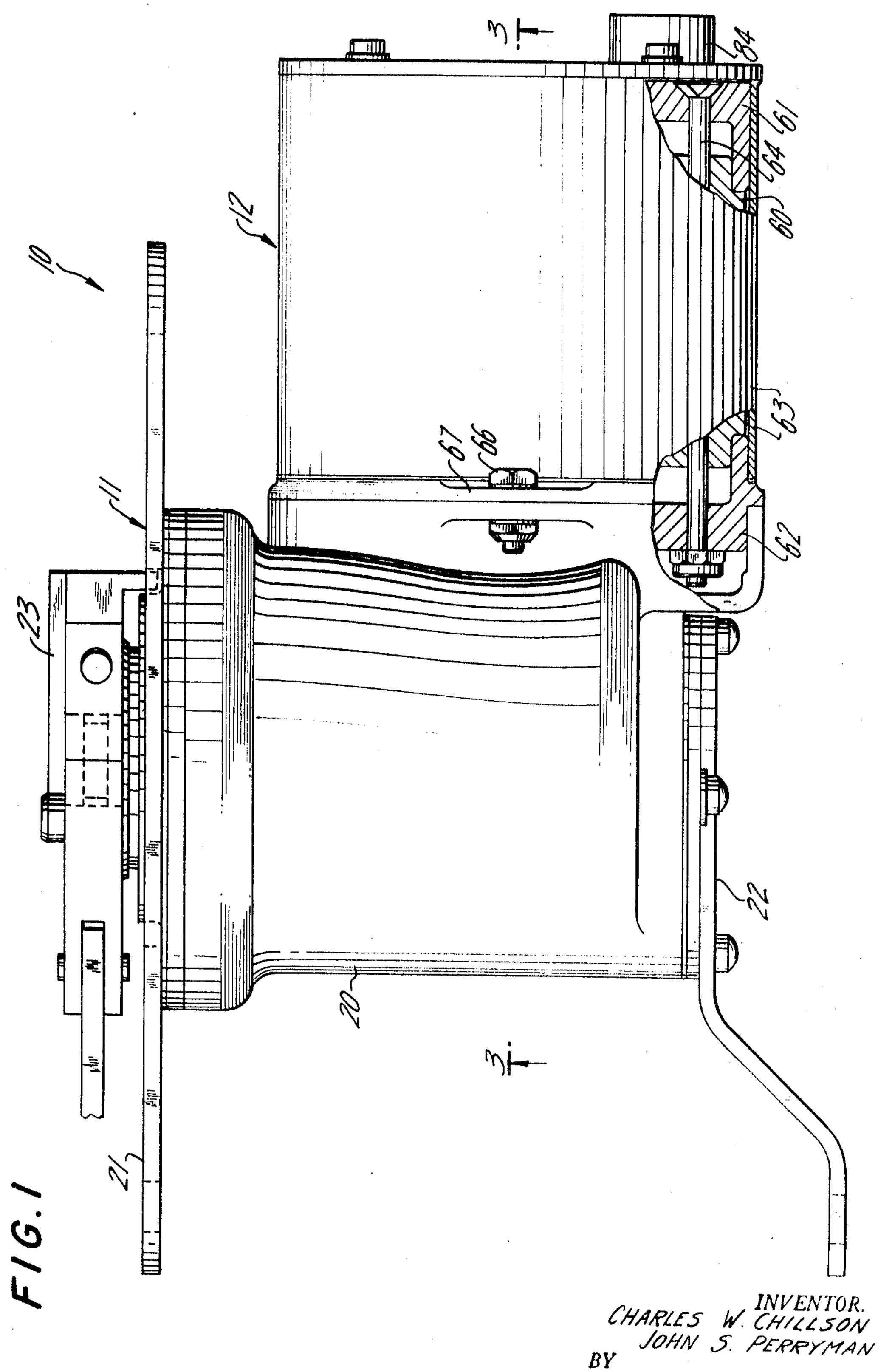
FIG. 1 is a top plan view of the mechanical servo actuator according to this invention.
Figure 2:
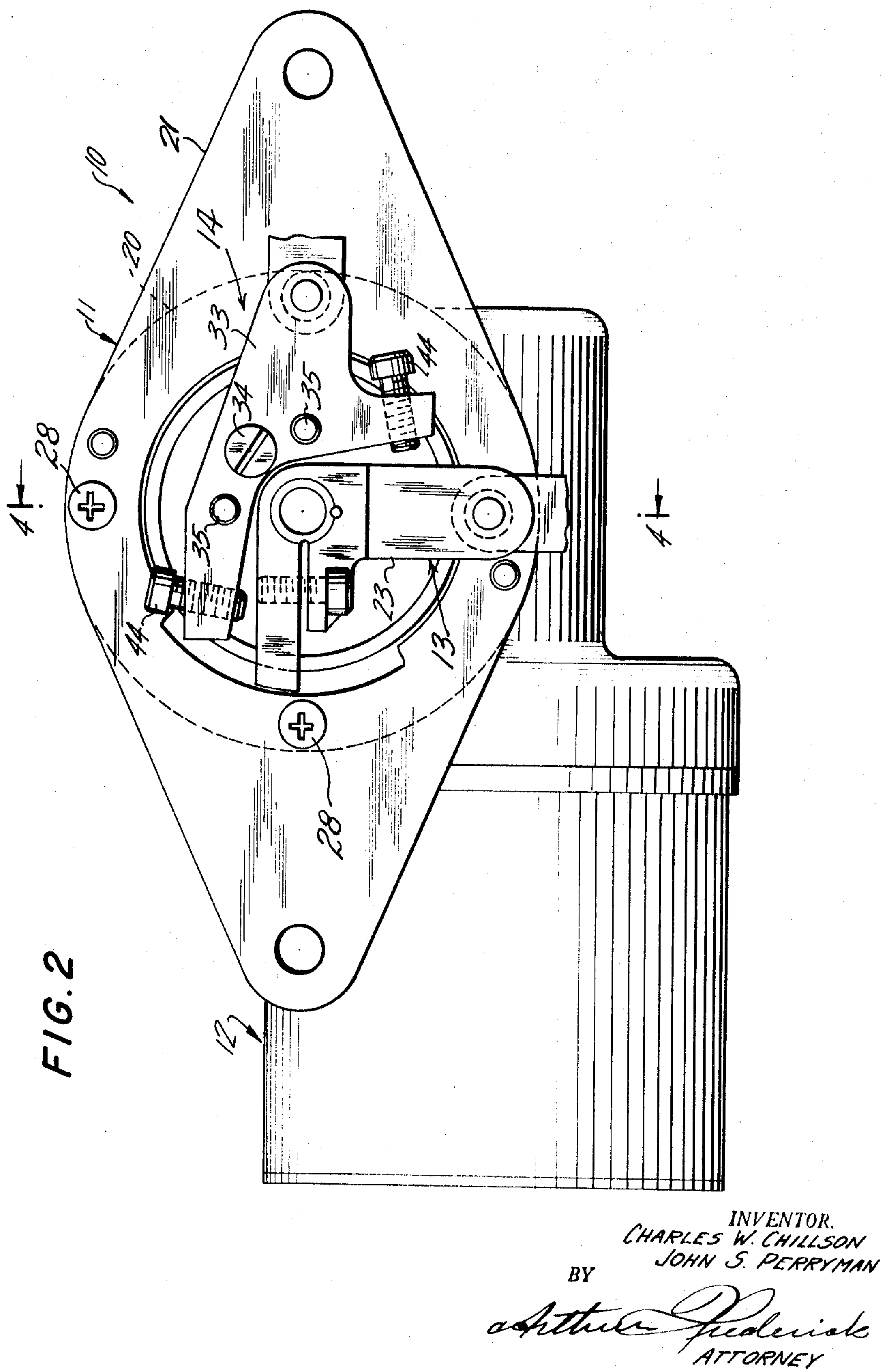
FIG. 2 is a side view in elevation of the mechanical servo actuator shown in FIG. 1.
Figure 12:
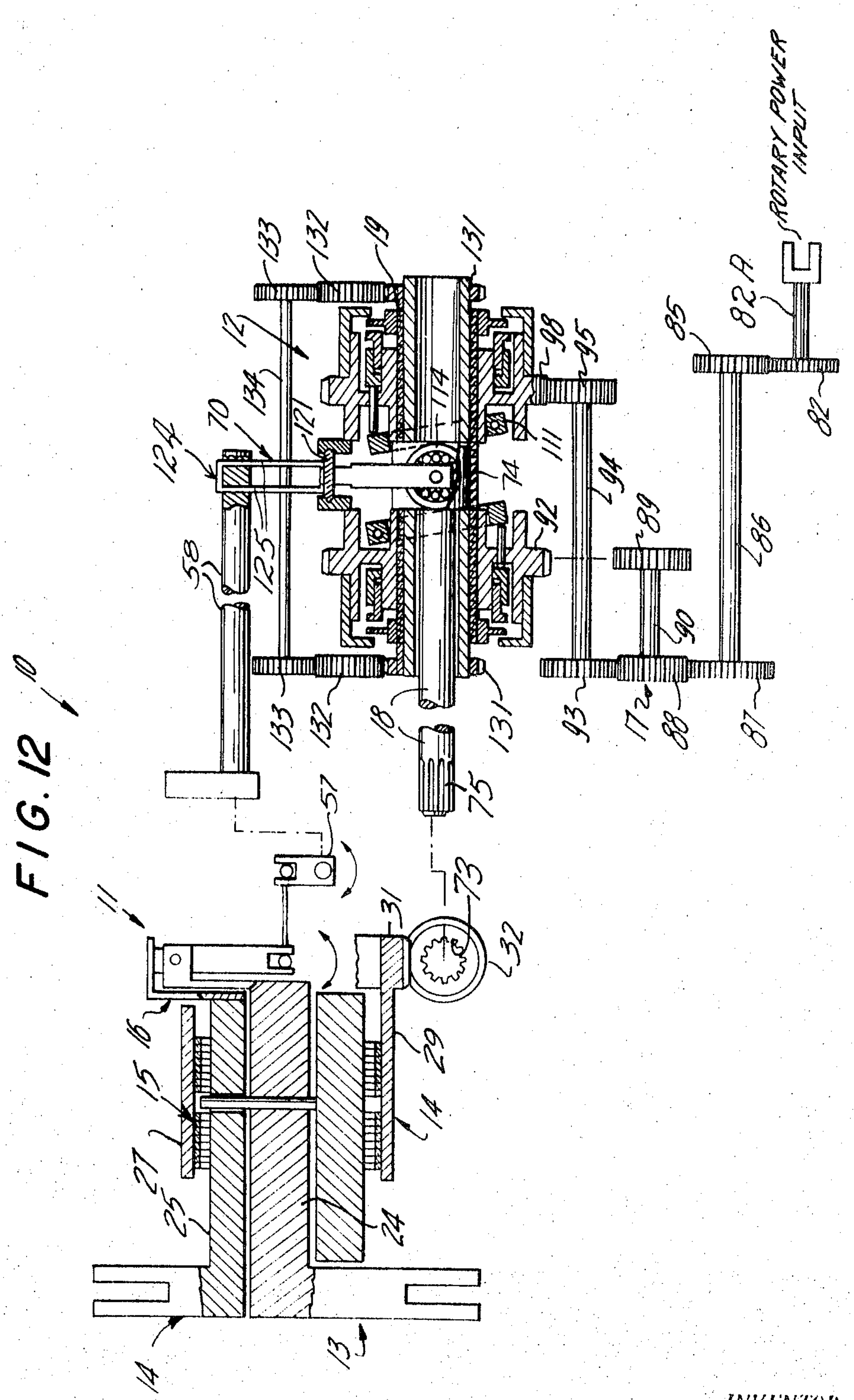
FIG. 12 is a schematic drawing of the mechanical servo actuator of this invention.

Now referring to the drawings and, more specifically, to FIGS. 1, 2 and 12, the reference number 10 generally designates the mechanical servo actuator according to this invention which is particularly suitable for actuating, in response to pilot demands, the swashplate of helicopters. While the invention is particularly useful in flight control systems of helicopters, the invention is not limited thereto and may be employed, without departure from the scope and spirit of this invention, wherever it is desired to provide, in rapid response to a signal movement of relatively small magnitude of force and distance, a comparable output movement of substantially greater magnitude of force. The mechanical servo actuator 10 comprises two major subassemblies, a bypass unit 11 and a power amplifier 12. The bypass unit 11 includes an input signal means 13 and an output power means 14 interconnected through a normally engaged clutch means 15. A measuring and transmitting means 16 is also included in bypass unit 11, which means is connected to both input signal means 13 and output power means 14 to sense the relative positions of input signal means 13 and output power means 14. The power amplifier 12 comprises a rotary force amplification means in the form of a reduction gear train 17 which is drivably connected to a source of rotary power (not shown) and an output member or shaft 18 to rotatively drive the latter through a bidirectional clutch means 19 when the latter is engaged, output member 18 being connected to output power means 14 to rotate the latter. The bypass unit 11 is connected through suitable connections or linkages (not shown) to a control means, such as the control stick of a helicopter, which, when actuated by the operator or pilot, causes the input signal means to arcuately move. The relatively small, weak arcuate movement is transmitted to the power amplifier 12 and thereby effects an energization of bidirectional clutch means and the connection of reduction gear train 17 with output member 18 which, in turn, rotates power output means 14 for only that length of time necessary to provide comparable powered rotative movement of power output means 14 in the direction indicated by the input signal means 13 as sensed by measuring and transmission means 16.

BYPASS UNIT

As best shown, in FIGS. 1 to 4 and 10, bypass unit 11 has a housing 20 which supports input signal means 13, output power means 14 and measuring and transmitting means 16. At opposite ends of housing 20 are secured a mounting flange 21 and mounting bracket 22 by which mechanical servo actuator 10 is secured in place.

Figure 4:
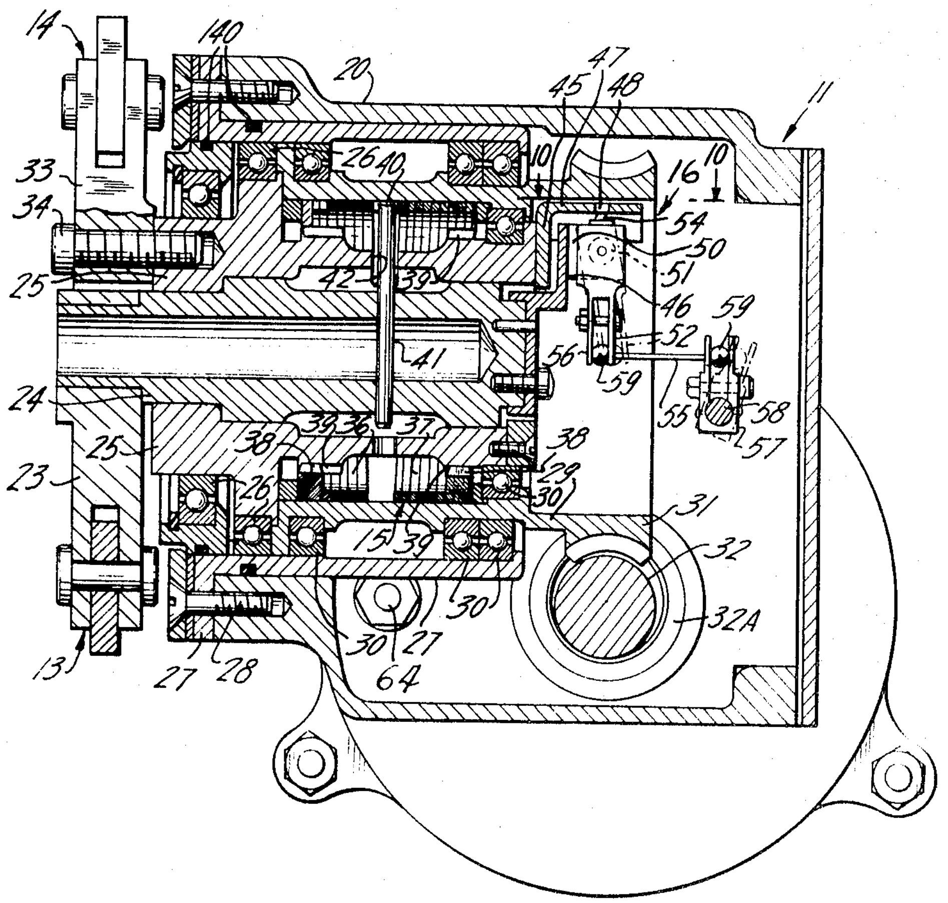
FIG. 4 is a view in cross section taken substantially along line 4–4 of FIG. 2.

The input signal means 13 comprises an arm 23 which is connected through a linkage system to a control or actuating means, such as the pilot control stick of a helicopter. As best illustrated in FIG. 4, arm 23 is clamped to the end of an input shaft 24 which projects from housing 20. Input shaft 24 is supported for limited rotation within an output sleeve 25. The output sleeve 25 is supported for rotation on bearing assemblies 26 in a sleeve 27 which is secured in housing 20 at its flanged end portion by screws 28.

The output power means 14, which includes output sleeve 25, comprises a tubular worm gear member 29 disposed between sleeve 27 and output sleeve 25. The worm gear member 29 is supported for rotation relative to sleeve 27 on bearings 30. The worm gear member 29 has an axially projecting gear 31 which meshes with a worm 32 which is rotatively driven by output shaft 18 of power amplifier 21 and supported in bearings 32A (see FIG. 3). The output power means 14, also, includes an arm 33 which is connected to output sleeve 25 by a screw 34 and positioning pins 35 (FIG. 2) for conjoined rotation with the latter. The arm 33 is connected, through suitable linkages, to a member to be actuated, (not shown), as for example, the swashplate of a helicopter. To effect transmission of rotative movement of gear 31 to output sleeve 25, clutch means 15 is provided.

The clutch means 15 comprises two springs 36 and 37 each of which has an enlarged, internally splined end portion 38 which engages peripheral splines 39 on output shaft 25. At the opposite end of each of the springs 36 and 37 an offset or toe portion 40 is provided to be on opposite sides of a release pin 41 which is carried by input shaft 24 and extends through a slot 42 in output sleeve 25. Each of the springs 36 and 37 is in an interference fit with the inner clutch surface of worm gear member 29 and are helically wound in the same direction so that, in one direction of rotation, rotation is transmitted through one of the springs 36 or 37 while the coils of the other spring are contracted to thus disengage the spring from worm gear member 29. In override operation, as where power amplifier 12 is defective, the relative rotational position of input shaft 24 and output sleeve 25 increases until release pin 40 engages toe 40 of either spring 36 or 37, depending upon the direction of rotation, thereby causing the coils of the spring associated with the engaged toe 40 to contract, thus disengaging the spring from the inner clutching surface of worm gear member 29 and terminating the rotative connection between worm gear member 29 and output sleeve 25. This disconnection of worm gear member 29 and output sleeve 25 frees output sleeve 25, in that direction of rotation, from power amplifier 12 and permits unencumbered transmission of movement from input arm 23 to output arm 33 through adjustable stop screws 44 carried in output arm 33 (see FIG. 2), the spacing of release pin 41 from each toe 40 of springs 36 and 37 being proportionate to the spacing between stop screws 44 and input arm 23 so that clutch disengagement occurs substantially simultaneously with engagement of input arm 23 and stop screws 44.

Figure 3:
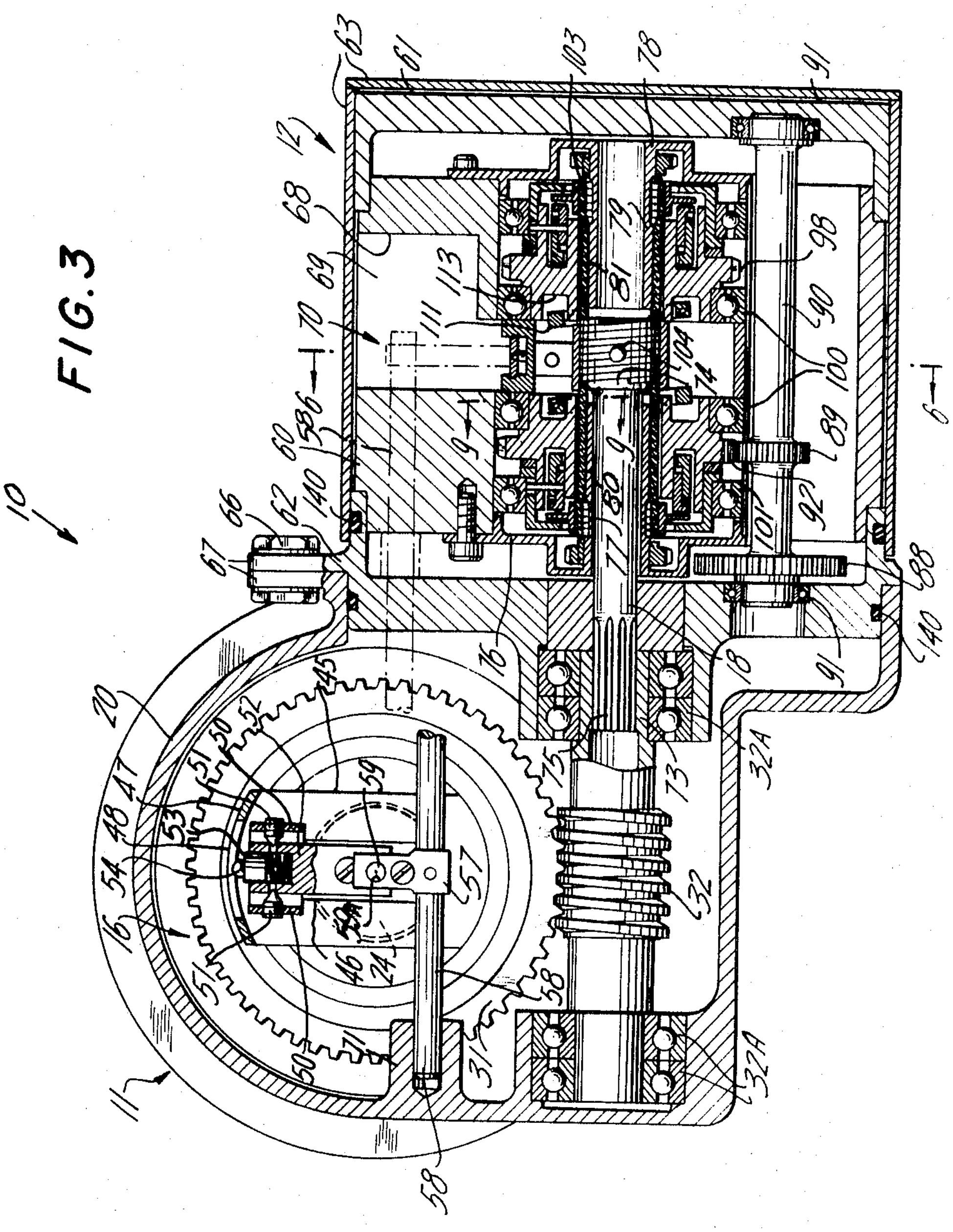
FIG. 3 is a cross-sectional view taken substantially along
Figure 10:
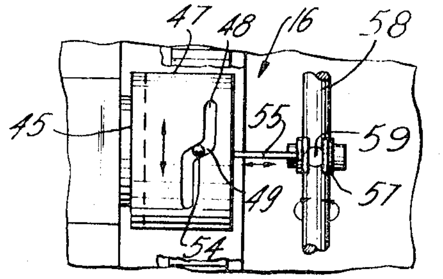
FIG. 10 is a fragmentary view in cross section taken along line 10–10 of FIG. 4 showing the signal input signal measuring and transmitting means in elevation.

As best shown in FIGS. 3, 4 and 10, bypass unit 11 also includes the measuring and transmitting means 16 which comprises a camming bracket 45 secured to the inner ends of output sleeve 25 and a cam follower bracket 46 secured to the inner end of input shaft 24 so that each bracket rotatively moves with the shaft or sleeve to which it is connected. The bracket 45 is L-shaped in cross section and has an integral arcuate shaped portion 47 projecting coaxially with input shaft 24. A camming groove 48, having laterally offset parallel portions connected by a canted portion 49, is provided in portion 47 of bracket 45. The follower bracket 46 has two spaced parallel ears 50 (see FIG. 3) which underlie portion 47 of bracket 45 and extend transversely of camming groove 48. Each ear 50 carries a pivot pin 51 which pivotally supports a cam follower link 52. As shown in FIG. 3, link 52 carries a spring biased plunger 53 which supports a spherical or ball follower 54 in engagement with camming groove 48. The follower 54 is dimensioned to partially enter camming groove 48. Relative rotative movement of input shaft 24 to output sleeve 25 will cause follower 54 to move relative to the inclined portion 49 of camming groove 48 and thereby be forced laterally to the right or left in a direction as viewed in FIGS. 4 and 10, depending upon the direction of rotation of input shaft 24. This lateral camming action of camming groove 48 on ball 54 causes link 52 to swing about pivot pins 51 (see FIG. 4). To transmit this arcuate movement, a ball link 55 is connected at one end to the bifurcated, distal, end portion 56 of link 52 and, at the opposite end, to a bifurcated connector 57 which is secured to an input signal rod 58. The ball link 55 consists of a ball 59 secured to opposite ends of a rod. The balls 59 are dimensioned to partially seat within a socket formed by aligned openings 59A in the legs of the bifurcated portion 56 of link 52 and in the legs of the bifurcated connector 57 (only one opening being shown in FIG. 3). As illustrated in FIG. 4, arcuate movement of link 52 is transmitted to bifurcated connector 57 by ball link 55 which effects rotative movement of signal rod 58 about its longitudinal axis since connector 57 is clamped to rod 58. Signal rod 58 constitutes part of power amplifier assembly 12 and the means for transmitting an input signal from bypass unit 11 to power amplifier 12.

POWER AMPLIFIER

Figure 5:
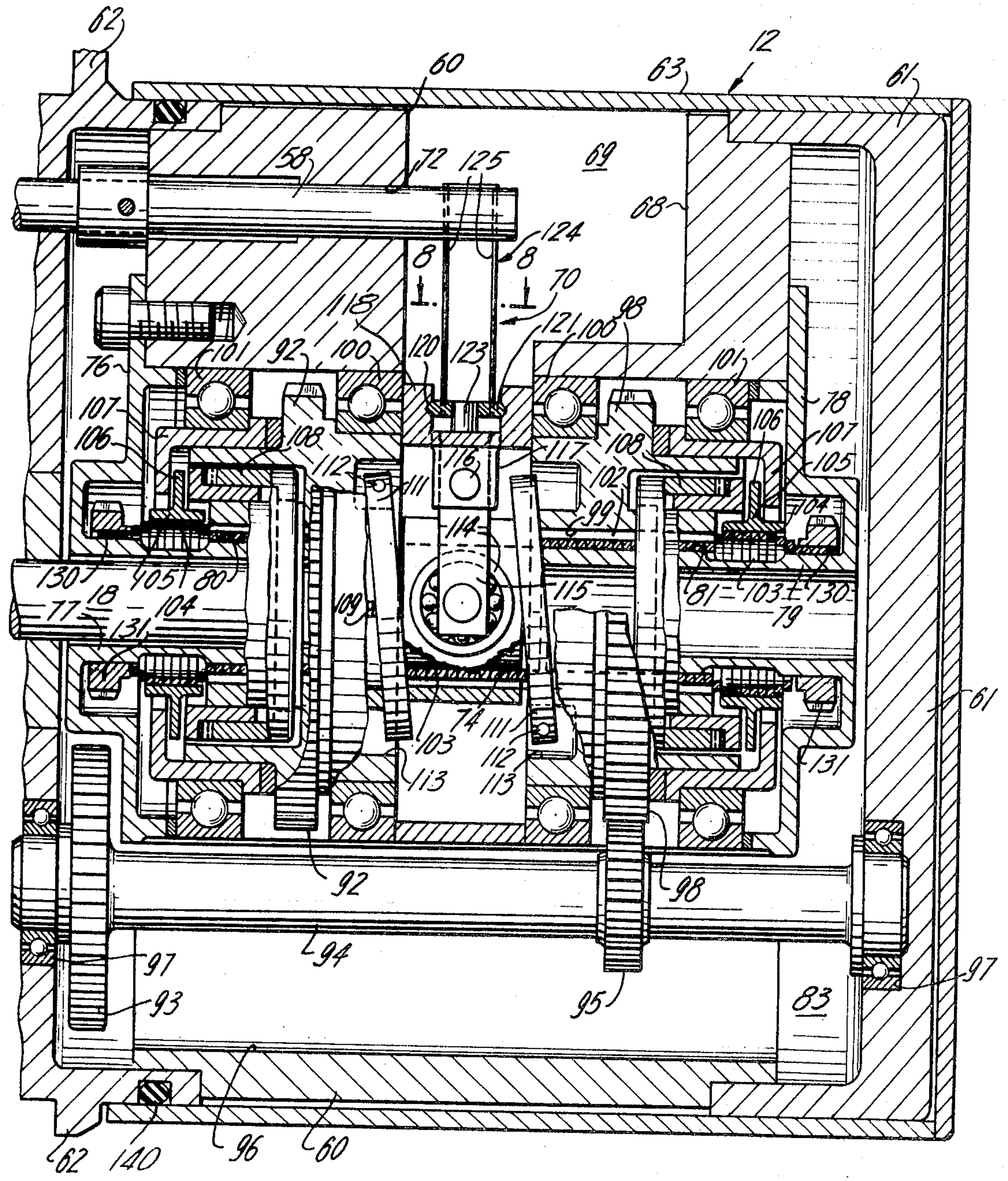
FIG. 5 is a fragmentary cross-sectional view on an enlarged scale showing the power amplifier according to this invention.

As best shown in FIGS. 3, 5 to 9, and 11, power amplifier 12 has a hollow cylindrical housing 60 closed by end plates 61 and 62 and sealed by a cover 63. The end plates 61 and 62 are secured to housing 60 by two tie-bolts 64 and 65 (see FIGS. 1 and 6). The end plate 62 is connected to housing 20 of bypass unit 11 by bolts 66 which pass through registered holes in circumferentially spaced, radially extending ears 67 in housing 20 and end plate 62 (see FIGS. 6 and 11) to form bypass unit 11 and power amplifier 12 into a unitary structure or assembly. The housing 60 is provided with a stepped chordal notch or groove 68 in the peripheral wall. The groove 68 defines with cover 63 a chamber 69 into which signal input rod 58 projects and within which the signal input means 70 of the clutch energizing means operates, as will be more fully understood hereinafter. As best shown in FIGS. 3 and 5, signal input rod 58 is supported, at one end, in a boss 71 in housing 20 and at the opposite end, in a bore 72 in housing 60. The end plate 62 has an integral hub portion which serves to support one of the bearings 32A in which is journaled the internally splined shank portion 73 of worm 32.

OUTPUT SHAFT

Figure 6:
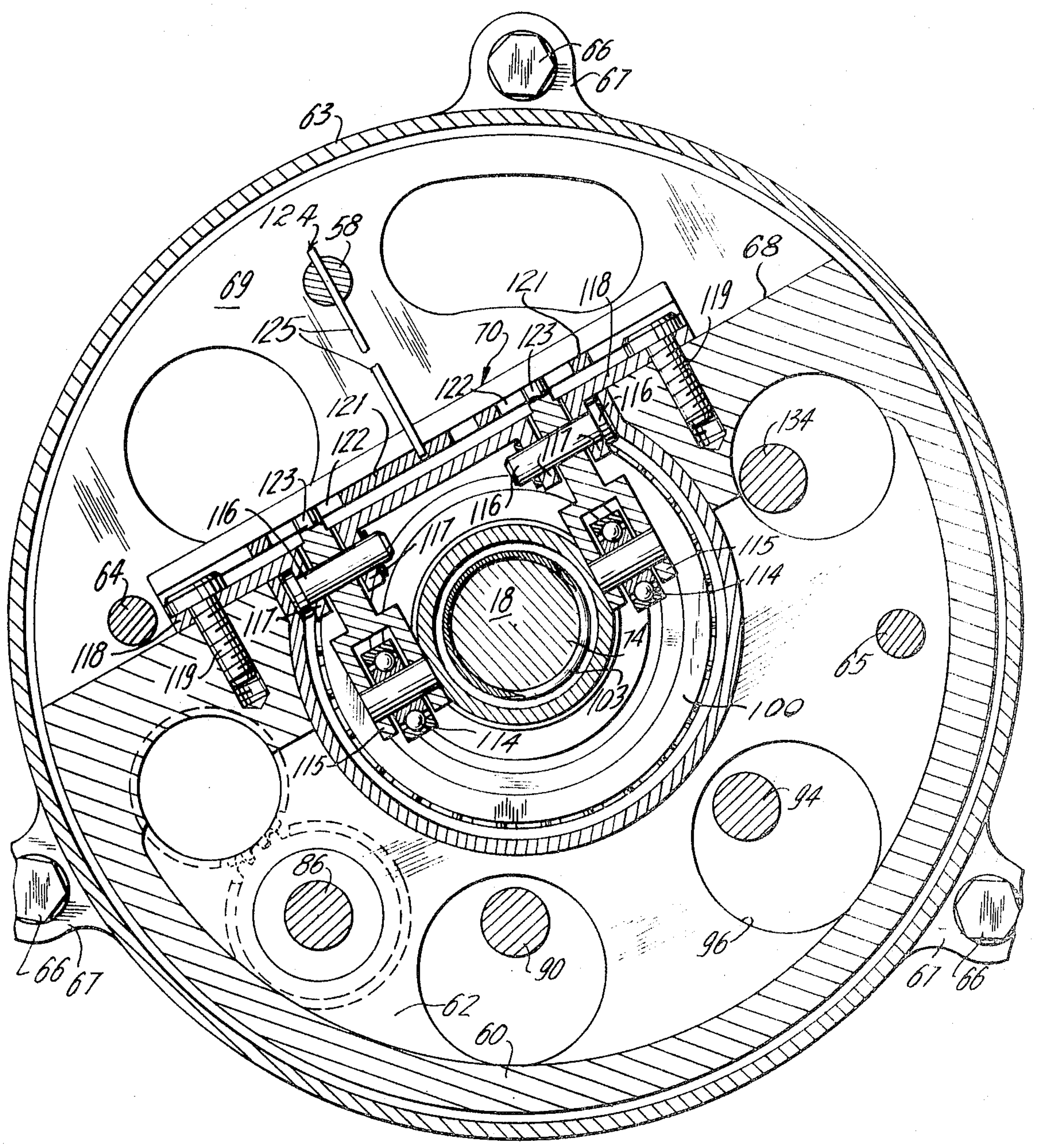
FIG. 6 is a transverse cross-sectional view taken along line 6–6 of FIG. 3 and on the same scale as FIG. 5.

As is best illustrated in FIGS. 3 and 5, output shaft 18 has an enlarged end portion 74 and an opposite externally splined end portion 75 which meshes with the internal splines of shank portion 73 of worm 32 (see FIGS. 1 and 6). Output shaft 18 is partially supported for rotation in a cap member 76 which is fixedly secured to housing 60 and has an axial, tubular hub portion 77 through which output shaft 18 extends. A second cap member 78 of identical construction to cap member 76 is secured to the wall of housing 60 opposite from cap member 76 so that its tubular hub portion 79 lies in juxtaposition to hub portion 77 and coaxial with the axis of output shaft 18. As will be explained more fully hereinafter, the respective outer peripheral surfaces of tubular hub portions 77 and 79 form braking surfaces 80 and 81, which constitute part of the bidirectional clutch means 19. As previously stated, output shaft 18 is driven by a source of rotary power (not shown), through gear reduction train 17 in a direction as determined by the bidirectional clutch means 19, in response to the input signal transmitted to signal input means 70.

GEAR REDUCTION TRAIN

Figure 11:
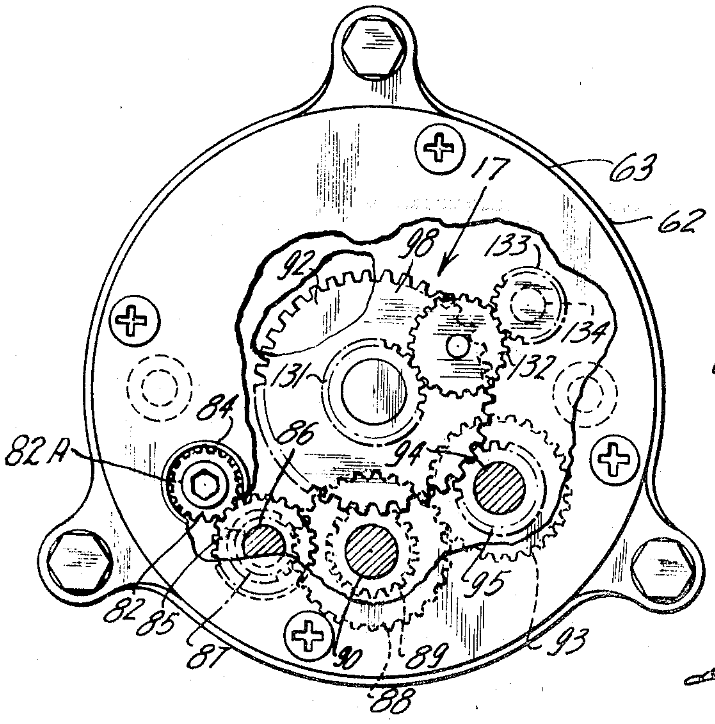
FIG. 11 is an end elevational view of the power amplifier as viewed from the right in FIG. 3.

The gear reduction train 17 comprises, as shown in FIGS. 11 and 12, an input gear 82 which is journaled in end plate 61 attached to housing 60 for rotation in the space 83 formed between housing 60 and end plate 61. The end plate 61 is provided with an integral tubular projection 84 (see FIGS. 1 and 11) through which the splined end of a drive shaft (not shown) projects and engages the internally splined stud shaft 82A to which gear 82 is secured, the drive shaft being connected to a source of rotary power (not shown). The input gear 82 is in drivable engagement with a gear 85 which is mounted on or may be integral with an elongated stud shaft 86. The stud shaft 86 extends through a circular opening in housing 60 and is journaled in bearings mounted in end plates 61 and 62. A second gear 87 is also secured to shaft 86 spaced from gear 85 and to mesh with a gear 88. Similar to gears 85 and 87, gear 88 and another gear 89 are mounted on an elongated stud shaft 90 which extends through another circular opening in housing 60 and is journaled in bearings 91 supported in end plates 61 and 62. As best shown in FIG. 3, gear 89 is disposed in meshing relationship with a drive gear 92 by which shaft 18 is rotated in one direction, as for example, clockwise through bidirectional clutch 19. Gear 88 meshes with a gear 93 which is carried on an elongated stud shaft 94. As best shown in FIG. 5, a gear 95 is also secured to stud shaft 94. In the same manner as stud shaft 90, stud shaft 94 extends through a circular opening 96 in housing 60, similar to the other openings through which shafts 86 and 90 extend, and is journaled, at opposite ends, in bearings 97 supported in end plates 61 and 62. The gear 95 is disposed in meshing relationship with a drive gear 98, similar to drive gear 92, to rotate shaft 18, through bidirectional clutch 19, in the opposite direction, as for example, counterclockwise. The gears 82, 85, 87, 88, 89 and 92 in one gear train and gears 82, 85, 87, 88, 93, 95 and 98 of the other gear train and gears 82, 85, 87, 88, 93, 95 and 98 of the other gear train are of such relative sizes as to provide a speed reduction from gear 82 to drive gears 92 or 98 of as, for example, about 10 to 1. Thus with input gear 82 driven at 6,000 r.p.m., drive gears 92 and 98 would be driven at 600 r.p.m.

Figure 7:
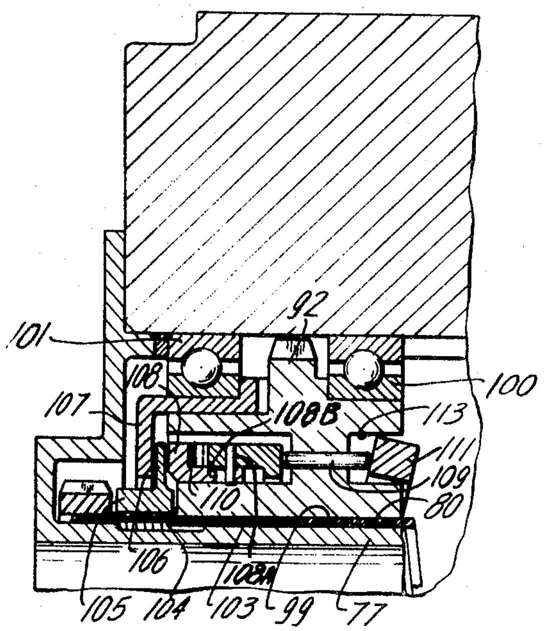
FIG. 7 is a fragmentary view in cross section showing the spring clutch energizing means.

As best shown, in FIGS. 5 and 7, drive gears 92 and 98 are each provided with a central bore 99 to receive therethrough tubular hubs 77 and 79 of cap members 76 and 78, respectively. Each drive gear 92 and 98 is rotatively supported in spaced parallel relationship to each other by a pair of bearings 100 and 101 disposed in housing 60. Each bore 99 of drive gears 92 and 98 is of such diameter as to define with the outer peripheral surfaces of the associated tubular hubs 77 and 79 an annular space 102 for receiving part of the bidirectional clutch means 19.

BIDIRECTIONAL CLUTCH MEANS

The bidirectional clutch means 19 comprises a single, helically wound spring 103 which is secured at the center by a pin 103A (see FIG. 3) anchored in the enlarged end portion 74 of output shaft 18 and projecting through an opening in the spring. From pin 103A the spring extends in opposite directions in annular spaces 102 and in overlying relationship to tubular portions 77 and 79. Obviously, without departure from the scope and spirit of this invention, spring 103 may be constructed of two springs each of which is connected at one end to output shaft 18, similar to spring clutch devices disclosed in U.S. Pats. No. 2,946,417 and No. 2,947,278. The spring 103 is preferably of conventional "flat-wound" construction and dimensioned to be in interference fitting relationship with braking surfaces 80 and 81 of tubular portions 77 and 79 respectively. Each of the opposite end portions 104 of spring 103 is formed so that the outer surface of the coils of portion 104 are in interference fit with disc-sleeve element 105. Each disc-sleeve element 105 has an annular flange portion 106 which is disposed between a cap 107 and a bungee 108 carried by each of the drive gears 92 and 98.

SPRING ENERGIZING MEANS

Figure 9:
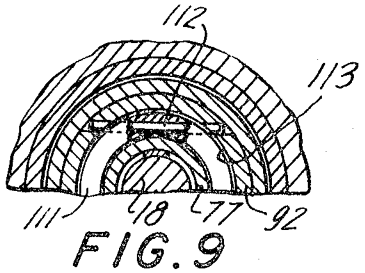
FIG. 9 is a fragmentary cross-sectional view taken along line 9–9 of FIG. 3 showing the pivotal mounting means of the camming rings.

The sleeve 106 and bungee 108 constitute part of the means for selectively energizing spring 103 for causing the normally disengaged spring to unwrap and engage drive gear 92 or 98 and thereby effect transmission of rotation from the drive gears 59 to output shaft 18 as will be more fully understood hereinafter. As best shown in FIG. 7, each bungee 108 comprises two coaxially overlapping sleeves which are free to axially slide relative to each other and the drive gear in which they are carried within the limits set by the coaction of a pin 108A carried by one of the sleeves and a slot 108B in the other sleeve. To effect slidable movement of each bungee 108, two diametrically disposed pins 109 (only one of which is shown in FIG. 7) are carried in each of the drive gears adjacent bungee 108, pins 109 being free to move axially relative to the drive gear and bungee 108. A wave spring 110 is interposed between the sleeves of each bungee to resiliently bias the sleeves apart in an axial direction to where pin 108A is in abutment against the end of slot 108B. The opposite ends of each pair of pins 109, from the associated bungee, are in contact with a camming ring 111. As best shown in FIGS. 5 and 9 each camming ring 111 is pivotally supported by a pin 112 within an annulus 113 formed in the face of each of the drive gears 92 and 98. To effect pivotal movement of camming rings 111, a cam follower assembly is disposed between the camming rings 111 carried by drive gears 92 and 98.

As best shown in FIGS. 5 and 6, the cam follower assembly comprises two rollers 114 supported diametrically of each other on either side of output shaft 18 and between camming rings 111. Each roller is mounted in a support 115 which is pivotally suspended by a pin 116 projecting between depending spaced ears 117 of a frame 118. The frame 118 is secured by screws 119 in stepped groove 68 in housing 60 and extends transversely of the longitudinal axis of output shaft 18. The frame 118 is provided with spaced, parallel grooves or guideways 120 which are adapted to receive two cam plates 121 for slidable movement relative to frame 118 (see FIG. 8). Each of the cam plates 121 is provided with angularly disposed grooves 122 into which extends a distal end portion 123 of roller supports 115. Since grooves 122 are canted in relation to the rectilinear movement of cam plates 121, rectilinear movement of the cam plates under the urging of input signal means 70, imposes upon distal end portions 123 of roller supports 115, through the camming action of the sides of grooves 122, a lateral force component directed parallel to the longitudinal axis of output shaft 18. This lateral force component exerted upon end portion 123 causes roller supports 115 to pivotally move about pins 116 and thereby bring rollers 114 more fully into the rotative path of camming rings 111 and contact with the camming rings. The cam plates 121 are held or locked in their adjusted position by selecting the angularity of grooves 122 so that the components of the reaction forces (feedback loads) acting upon the cam plates, through the distal end portion 123 and groove 122 when rollers 114 engage the camming rings 111, provide a greater frictional force between the cam plate and guideway than the force component directed parallel to the guideways. The engagement of rollers 114 with camming rings 111, in response to the action of input signal means 70, the structure and function of which will be more fully described hereinafter, causes the camming rings to pivot about their pivot support pins 112. This pivotal movement of camming rings 111 forces the pins 109, carried by drive gear 92 or 98 (depending upon the direction of pivotal movement), axially against bungee 108 to force the latter axially. The axial movement of bungee 108, to the left as viewed in FIG. 7, clamps flange portion 106 of disc-sleeve element 105 against cap 107. Since the bungee and cap 107 are rotatively carried by drive gears 92 and 98, the gripping of sleeve element 105 by the bungee and cap results in the rotative acceleration of the disc-sleeve element. The rotation of disc-sleeve element 105, in turn, forces the coils of spring portion 104 to unwrap or expand and thereby disengage from brake surface 80 or 81 of the associated tubular hub portions 77 and 79 and engage the surface of bore 99 of the associated drive gear 92 or 98. Thus, by the energization of spring 103, as herein set forth, rotation of drive gear 92 or 98 is transmitted through spring 103 to output shaft 18.

INPUT SIGNAL MEANS

Figure 8:
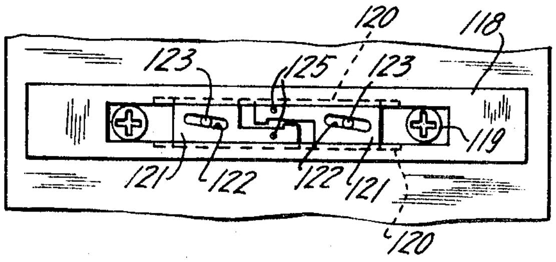
FIG. 8 is a fragmentary view in cross section taken substantially along line 8–8 of FIG. 5 and on a smaller scale.

As best shown in FIGS. 5, 6 and 8, input signal means 70 comprises, in addition to cam plates 121, a U-shaped wire element 124, such as piano wire, which has inherent resiliency. The wire element 124 is secured to the distal end portion of input rod 58 so that the two legs 125 of the wire element lie in a plane coextensive with a plane containing the longitudinal axis of the input rod. The distal end of each leg 125 is secured in one of the cam plates 121. With this interconnection between input rod 58 and cam plates 121, rotation of input rod 58 causes, through legs 125 of wire element 124, cam plates 121 to slide in grooves 120, thus causing pivotal movement of rollers 114 and the energization of spring 103 as previously described.

The rollers 114 and the camming rings 111 are dimensioned and arranged so that, at every revolution of drive gears 92 and 98, and, hence, camming rings 111, each camming ring is contacted twice, once by each roller. This contact, during periods of no input signal, is not sufficient to cause energization of clutch spring 103, but is sufficient to effect axial movement of each bungee 108 twice in every revolution of the drive gears or 1200 oscillations per minute at 600 r.p.m. of the drive gears. This cyclic indexing or high-frequency dither of bungee 108 is only of sufficient distance to take up the "dead band" or lost motion between the null or neutral position of the bungee and the point at which disc-sleeve element 105 is squeezed between the bungee and cap 107. When an input signal is transmitted to input signal means 70 (FIGS. 5, 6 and 12) which functions to cause rollers 114 to pivotally move, as heretofore described, toward one of the camming rings 111 (depending upon the direction of rotation desired), the camming ring thus engaged is pivoted to increase the axial displacement of the associated bungee 108 a distance sufficient to squeeze flange portion 106 against stationary cap 107, thereby energizing spring 103 and effecting the rotation of output shaft 18. The amount of this axial movement of the bungee 108 is directly proportionate to the magnitude of the movement of the input signal and therefore increases or decreases as the movement of the input signal varies. Axial movement of bungee 108 in excess of that required to engage and squeeze flange portion 106 against cap 107 is taken up by relative movement of the bungee sleeves and compression of bungee spring 110. Since at any one moment of time one roller 114 is in engagement with the camming ring 111 while the other roller is free and since legs 125 of wire element 124 can flex independently of each other, an input signal can be transmitted through the free or unloaded roller 114, by virtue of the take up of the lost motion by the other roller, with minimal reaction lag to achieve energization of the spring 103. Also since the input signal can be transmitted through the free roller, the roller is pivotally actuated against only the small resistive load imposed by the inertia of the roller to be moved and, therefore, a very small or relatively weak input signal force, as for example about 0.5 lbs-in. is required to effect energization of spring clutch means 19 and produce an output force of large magnitude, as for example, 1,142.0 lbs-in.

The spring clutch means 19, including the spring energization means according to this invention comprises, in effect, a dual, counterrotating clutch system with the energization assembly (rollers 114 and coacting camming rings 111) disposed between the two clutches, energization of one clutch being impossible without deenergization of the other clutch. Expressed in other words, simultaneous energization of both clutches cannot occur because energization of the clutches in response to the input signal is through rollers common to both clutches.

SYNCHRONIZATION GEARING

To further insure the synchronized engagement and disengagement of the portions of clutch spring 103 associated with drive gears 92 and 98 so that when one spring portion is engaged the other is disengaged, the opposite ends of clutch spring 103 are interlocked through a light weight gearing. As best shown in FIGS. 5 and 11, the opposite ends of spring 103 are provided with axial extending tangs 130 each of which interlock with a gear 131 mounted for rotation on tubular hubs 77 and 79 (see FIG. 5). As shown in FIGS. 11 and 12, each of the gears 131 are in mesh with an idler gear 132 which, in turn, meshes with a gear 133 mounted on the opposite end portions of stud shaft 134. The stud shaft 134 is supported in housing 60 to extend substantially parallel to the longitudinal axis of output shaft 18. Thus, upon the acceleration of one of the disc-sleeve elements 105 and the uncoiling or unwrapping of spring portion 104, the gear 131 connected, through tang 130, to that spring portion is caused to rotate. This rotation is transmitted to stud shaft 134, through gears 132 and 133. The rotation of shaft 134 effects rotation of gear 133 at the opposite end portion of the stud shaft and gear 131 associated with the opposite end of spring 103, through idler gear 132. The rotation of driven gear 131 acts, through tang 130, to contract or wrap-down the coils of spring portion 104 out of contact with the associated disc-sleeve 105 and thereby prevent energization and engagement of the spring 103 with the bore of drive gear 92 or 98. Thus, the interconnection of the opposite ends of spring 103 insures that the spring portion associated with the drive gears 92 and 98 cannot simultaneously be energized to transmit rotation in opposite directions to output shaft 18.

To provide for lubricating the mechanical components of servo actuator 10, the interstices between various housing components are sealed by O-rings 140 (see FIG. 5) so that a reservoir of lubricant can be retained in the housings 20 and 60 to provide splash lubrication of internal components.

OPERATION

In operation of the mechanical servo actuator 10, according to this invention as herein described, drive gears 92 and 98 are being rotated in opposite directions through gear train 17. For purposes of illustration, it will be assumed that the drive shaft (not shown), which is spline connected to input gear 82 and is rotatively driven by a source of rotary power (not shown), is rotated in a clockwise direction. This clockwise rotation of gear 82 is transmitted, through gears 85, 87, 88, 93 and 95, to effect counterclockwise rotation of drive gear 98 and, through gears 85, 87, 88 and 89, to effect counterclockwise rotation of drive gear 92 (see FIGS. 11 and 12).

At this time with no input signal introduced into mechanical servo actuator 10, via the input means 13 of bypass unit 11, output shaft 18 is stationary because bidirectional spring clutch 19 is disengaged and no rotation is transmitted from either drive gears 92 or 98 to output shaft 18. However, camming rings 111 carried by each drive gear 92 and 98 are rotating and, as previously described, each camming ring 111 is engaged by each roller 114 once in every revolution to thereby effect a high frequency dither of the clutch energizing means. The high-frequency dither or oscillation functions to position the energizing components so that substantially all of the "dead band" or lost motion is removed and the time lag to effect energization is reduced to a minimum.

As shown in FIGS. 2 and 4, when an input signal is transmitted through suitable means (not shown) to arm 23 of input signal means 13, input shaft 24 is rotated. It will be assumed for purposes of illustration that the movement of arm 23 is such as to rotate input shaft 24 in a counterclockwise direction as the assembly is viewed from the left in FIG. 4. The rotation of input shaft 24 causes camming bracket 45 of measuring and transmitting means 16 to move arcuately in a counterclockwise direction, which movement causes ball 54 to be laterally moved to the left, as viewed in FIGS. 4 and 10, from the neutral or null position shown in the drawings. The lateral movement causes link 52 to pivot to a position, such as shown by the dot-dash lines in FIG. 4. The pivotal movement of link 52 rotates input shaft 58 in a clockwise direction when viewed in FIG. 4. In turn, this rotation of input shaft 58 carries wire element 124 in an arcuate path and, since it is connected through legs 125 to cam plates 121, a force (input signal) is exerted urging the cam plates to slide in frame 118 to the left as viewed in FIGS. 6 and 8. Since the input force transmitted through legs 125 is of very small magnitude and legs 125 can undergo deflection relative to each other, the cam plate associated with the roller 114 which is, at that moment, unloaded (that is, out of engagement with the camming rings 111), will be slid to the left by the coaction between the canted groove or slot 122 and end portion 123 of the roller support 115 of the free roller 114. This slidable movement pivots support 115 about pin 116 in a counterclockwise direction, as viewed in FIG. 5, thereby bringing the free roller 114 more fully into the path of rotation of camming ring 111, pivotally carried by drive gear 98. The other cam plate 121 to which the loaded roller 114 is connected follows the other cam plate under energy stored in the attached flexed leg 125 when the associated roller becomes unloaded. As previously described, this more full engagement of rollers 114 and camming ring 111, pivots the camming ring 111 sufficiently to cause bungee 108 to contact and squeeze flange 106 of disc-sleeve element 105 against cap 107. Since the cap and bungee 108 are carried by the drive gears 98, disc-sleeve 105 is rotatively accelerated when the disc-sleeve 105 is grasped between the cap and bungee. The rotation of disc-sleeve 105 causes the coils of the spring portion, associated with drive gear 98, to expand and thereby disengage from brake surface 80 and engage bore 99 of drive gear 98. With the clutch spring 103 thus engaged, and since it is anchored to output shaft 18, rotative movement of drive gear 98, in a clockwise direction, is transmitted to output shaft 18 through clutch spring 103.

The rotative movement of output shaft 18, as shown in FIG. 3, is transmitted to worm 32 of power output means 14 through the meshing splines 73 and 75 of worm 32 and output shaft 18, respectively. The rotative movement of worm 32 is transmitted to worm gear 31 which rotative movement effects rotative movement of output sleeve 25. This rotative movement, in a counterclockwise direction, as viewed from the left in FIG. 4, is transmitted by the output sleeve to output arm 33, via one of the springs 36 or 37 of clutch means 15. The output arm 33 is, in turn, through suitable connections (not shown) connected to actuate some member to be controlled (not shown), such as a swashplate of a helicopter control system.

The counterclockwise rotation of output sleeve 25, in addition to actuating output arm 33, carries cam follower bracket 46 in a counterclockwise direction to move ball 54 in groove 48 of camming bracket 45 toward the null position. If the initial cyclic movement of output shaft 18, as above described, does not move ball 54 to the null position, the bidirectional clutch means 19 effects engagement of drive gear 98 with output shaft 18 again and again until, the ball 54 returns to the null position within groove 48. At this time, servo actuator 10 is ready to receive another input signal which might require further rotation of output shaft 18 by drive gear 98 or rotation in the opposite direction through drive gear 92.

In the event that the power amplifier 12 is rendered inoperative or does not properly operate in response to input signals, as for example, in a runaway mode of operation, bypass unit 11 provides for overriding or bypassing the power amplifier to permit direct actuation of output arm 33 by input arm 23. As previously described in regard to the function of clutch means 15, when output shaft 18 and/or output sleeve 25 does not rotate in response to rotation of input shaft 24 (input signal), input shaft 24 can be rotated relative to output sleeve 25 until release pin 41 engages toe 40 of the spring 36 or 37, depending upon the direction of rotation, to disengage the spring and thereby interrupt the drivable connection between power amplifier 12 and output arm 34. As can best be seen by viewing FIG. 2, simultaneously with disengagement of clutch means 15, input arm 23 directly contacts output arm 33 through adjustment screws 44. In this manner output arm 33 is actuated directly by input arm 23, thus bypassing the other components of bypass unit 11 and power amplifier 12. This feature prevents feedback of loads imposed by the defective and inoperative power amplifier. The servo actuator 10 also permits the deliberate overriding or bypassing of the power amplifier 12 even when the latter is not defective so that it is possible to switch from automatic control, through the power amplifier, to direct control (direct contact of input and output arms) and back again to automatic control without loss of synchronism between the bypass unit 11 and power amplifier 12. This switching capability is provided for by measuring and transmitting means 16 which automatically senses, through position of ball 54 in camming groove 48, the angular relationship of input shaft 24 and output sleeve 25 and automatically effects movement of the power output member 14 to bring ball 54 to the null position in the camming groove. Since in the passive, null or hold position, where no input signal is being introduced into servo actuator, spring clutch means 19 locks the output shaft 18 to the fixed tubular hub portions 77 and 79 so that no constant power input is required to hold such position against the reacting forces or loads tending to urge a change in the position. Also, the spring clutch means 19 in the null or hold position functions, by locking output shaft 18, to prevent feedback loads to operator from the member to be controlled, such as a swashplate.

It is now believed readily apparent that the present invention provides a servo actuator of relatively simple, mechanical construction which provides for rapid power boost output in response to input signals of extremely small magnitude, thus providing high power gain. It is a servo actuator which does not impose a power drain to hold the servo actuator and the other parts of the control system in a passive, null or hold position against the reactive loads or forces tending to change the position. It is also an assembly which has a completely self-contained lubricating system, requiring no external oil supply piping, pumps or reservoirs. It is, furthermore, a servo actuator or relatively small, compact size capable of being disposed in a single location which renders the apparatus difficult to damage if used in a vehicle subject to hostile fire.

We claim:

1. A servo actuator for controlling the operation of an output mechanism comprising:

a. an input signal means operable to produce a signal movement of relatively small magnitude of force and distance;

b. a power amplifier connected to said signal means to receive said input movement and connected to a source of power and to said output mechanism;

c. said power amplifier having a clutch means operable in response to said input signal movement to connect the source of power to said output mechanism so that said signal is converted into a comparable output movement of substantially greater magnitude of force than said signal movement; and, d. said clutch means includes a spring and a spring energizing means constructed and arranged to be cyclically actuated sufficiently to take up the lost motion in the energizing means and yet not effect energization of the spring.

2. The apparatus of claim 1 where said source of power provides rotary output and the cyclical actuation is at a rate in excess of one oscillation per output revolution of the source of power.

3. The apparatus of claim 1 wherein said spring energizing means includes means for temporarily storing an input signal movement until the spring energizing means is relatively free of load except for its mass.

4. The apparatus of claim 1 wherein said spring energizing means includes a bungee connected to the clutch spring and camming means connected to the input signal means to be intermittently actuated by the latter and, in turn, actuate the bungee.

5. The apparatus of claim 1 including manual bypass means having a second clutch means for automatically bypassing the power amplifier and effecting direct connection of said input signal means with the output mechanism to thereby cause operation of the latter.

6. The apparatus of claim 1 wherein said second clutch means is a normally engaged spring clutch which, upon energization, disengages to permit direct connection of the signal means with the output mechanism.

7. The apparatus of claim 1 wherein said power amplifier comprises:

a.1. an output shaft journaled for bidirectional rotation;

b.1. a gear train connected to be rotatively driven by the source of rotary power and having a first gear for providing rotation in one direction and a second gear for providing rotation in the opposite direction;

c.1. a clutch, including a helically wound spring means, normally secured to said output shaft and in disengagement with the first and second gears; and d.1. clutch energizing means including bungee means operable in response to the input signal movement to cause engagement of the spring clutch means with the first gear or second gear and thereby effect rotation of the output shaft.

8. A servo actuator for controlling the operation of an output mechanism comprising:

a. an input signal means operable to produce a signal movement of relatively small, magnitude of force and distance;

b. a power amplifier connected to said signal means to receive said signal movement and connected to a source of power and to said output mechanism;

c. said power amplifier having mechanical means for connecting said source of power to said output mechanism in response to said signal movement so that said signal movement is converted into a comparable output movement of substantially greater magnitude of force than said signal movement; and, d. a manual bypass including a clutch means responsive upon energization to disconnect the power amplifier from the output mechanism and thereby permit direct drivable connection of the input signal means with the output mechanism.

9. The apparatus of claim 8 wherein said clutch means is a normally engaged coil spring means which, when disengaged, permits direct drivable connection between the input signal means and the output mechanism.

UNITED STATES PATENT OFFICE
CERTIFICATE OF CORRECTION

Patent No. 3,592,317 Dated July 13, 1971

Inventor(s) Charles W. Chillson and John S. Perryman

It is certified that error appears in the above-identified patent and that said Letters Patent are hereby corrected as shown below:

Column 1, after the last line add -- with the manual by-pass means for differentially comparing--;

Column 2, after the last line add -- line 3--3 of Fig. 1;---;

Column 6, line 25, after the word "train" delete -- and gears 82, 85, 87, 88, 93, 95 and--
line 26, delete "98 of the other gear train."

Signed and sealed this 11th day of January 1972.

(SEAL)
Attest:

EDWARD M.FLETCHER,JR.
Attesting Officer

ROBERT GOTTSCHALK
Acting Commissioner of Patents